US012566071B2

(12) United States Patent
Huang

(10) Patent No.: US 12,566,071 B2
(45) Date of Patent: Mar. 3, 2026

(54) METHOD OF ROUTE PLANNING AND ELECTRONIC DEVICE USING THE SAME

(71) Applicant: Wistron Corporation, New Taipei (TW)

(72) Inventor: Kuo-Lun Huang, New Taipei (TW)

(73) Assignee: Wistron Corporation, New Taipei (TW)

( * ) Notice: Subject to any disclaimer, the term of this patent is extended or adjusted under 35 U.S.C. 154(b) by 289 days.

(21) Appl. No.: 18/085,541

(22) Filed: Dec. 20, 2022

(65) Prior Publication Data

US 2024/0133698 A1    Apr. 25, 2024

(30) Foreign Application Priority Data

Oct. 18, 2022    (TW) .................................. 111139458

(51) Int. Cl.
G01C 21/34          (2006.01)

(52) U.S. Cl.
CPC .................................. G01C 21/343 (2013.01)

(58) Field of Classification Search
CPC ....... H04L 45/22; H04L 45/128; H04L 45/28; H04L 45/14; G01C 21/343; G01C 21/3423; G01C 21/34; G01C 21/3415; G01C 21/3446; G01C 21/3667; G06Q 10/08355; G06Q 10/047; G06N 3/126; G08G 1/0133
See application file for complete search history.

(56) References Cited

U.S. PATENT DOCUMENTS

| | | | | |
|---|---|---|---|---|
| 2022/0018664 A1* | 1/2022 | Haney | ................ | G01C 21/3415 |
| 2022/0397403 A1* | 12/2022 | Bickley | ........... | G06Q 10/08355 |
| 2023/0085055 A1* | 3/2023 | Bhat | ...................... | G01C 21/20 |
| | | | | 701/414 |

FOREIGN PATENT DOCUMENTS

| | | | | | |
|---|---|---|---|---|---|
| CN | 104866903 | A | * | 8/2015 | |
| CN | 104866903 | | | 9/2016 | |
| CN | 107292450 | | | 10/2017 | |
| CN | 112580865 | | | 3/2021 | |
| CN | 114970103 | | | 8/2022 | |
| GB | 2580410 | A | * | 7/2020 | ........... H04L 45/128 |
| GB | 2580410 | B | * | 10/2021 | ........... H04L 45/128 |

OTHER PUBLICATIONS

"Office Action of Taiwan Counterpart Application", issued on May 31, 2023, p. 1-p. 6.

* cited by examiner

*Primary Examiner* — Khoi H Tran
*Assistant Examiner* — Alyse Tramanh Tran
(74) *Attorney, Agent, or Firm* — JCIPRNET

(57) ABSTRACT

A method of route planning and an electronic device using the same method are provided. The method includes: obtaining multiple route points, and generating a route set according to the route points, wherein a first route in the route set includes a first order corresponding to the route points, wherein the first order includes a first route point and a second route point adjacent to the first route point; obtaining multiple weights respectively corresponding to the route points; calculating a first score of the first route according to a distance or time between the first route point and the second route point and the weights, and selecting the first route from the route set as a recommended route according to the first score; and outputting the recommended route.

16 Claims, 7 Drawing Sheets

100

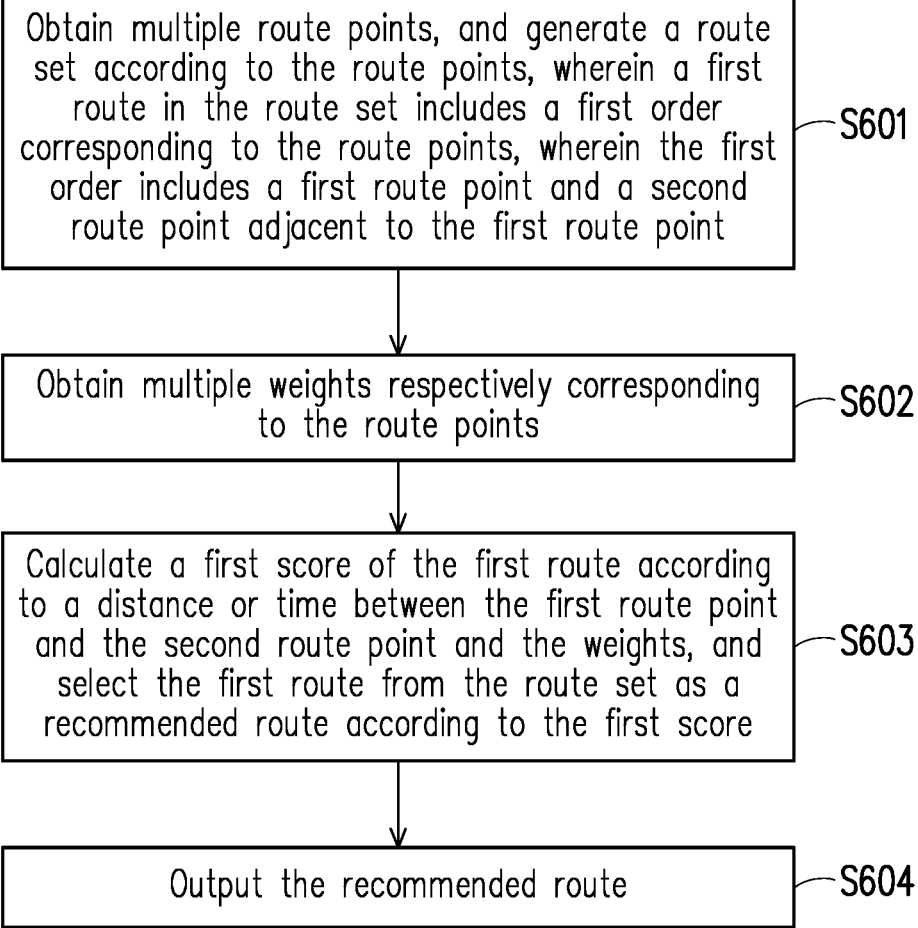

Obtain multiple route points, and generate a route set according to the route points, wherein a first route in the route set includes a first order corresponding to the route points, wherein the first order includes a first route point and a second route point adjacent to the first route point ⌐S601

Obtain multiple weights respectively corresponding to the route points ⌐S602

Calculate a first score of the first route according to a distance or time between the first route point and the second route point and the weights, and select the first route from the route set as a recommended route according to the first score ⌐S603

Output the recommended route ⌐S604

FIG. 6

METHOD OF ROUTE PLANNING AND ELECTRONIC DEVICE USING THE SAME

CROSS-REFERENCE TO RELATED APPLICATION

This application claims the priority benefit of Taiwan application serial no. 111139458, filed on Oct. 18, 2022. The entirety of the above-mentioned patent application is hereby incorporated by reference herein and made a part of this specification.

BACKGROUND

Technical Field

The disclosure relates to a scheduling technique, and more particularly to a method of route planning and an electronic device using the method.

Description of Related Art

With the development of navigation technology, current map applications (or navigation devices) may provide users with the function of route planning. The user may define one or more route points that the user intends to go. After the user has set the route point, the map application may generate a recommended route with the shortest route length based on the route set by the user, so that the user may go to each route point in the most time-saving manner.

However, the function of generating the shortest recommended route can no longer satisfy the requirements of some users. The length of the route is no longer the only consideration in generating the recommended route. For example, for a food delivery operator who needs to go to multiple locations, delivering food according to the shortest route may result in customers who ordered earlier getting their meals later, which will lead to a decline in the rating of the operator by the customers.

SUMMARY

The disclosure provides a method of route planning and an electronic device using the method, which can plan an optimal recommended route according to a weight of a route point.

A method of route planning of the disclosure includes: obtaining multiple route points, and generating a route set according to the route points, wherein a first route in the route set includes a first order corresponding to the route points, wherein the first order includes a first route point and a second route point adjacent to the first route point; obtaining multiple weights respectively corresponding to the route points; calculating a first score of the first route according to a distance or time between the first route point and the second route point and the weights, and selecting the first route from the route set as a recommended route according to the first score; and outputting the recommended route.

In an embodiment of the disclosure, the step of selecting the first route from the route set as the recommended route according to the first score includes: generating the recommended route according to a genetic algorithm, wherein a function value of an optimization equation of the genetic algorithm includes the first score.

In an embodiment of the disclosure, the method further includes: generating a first initial route set according to the route points; and generating the route set according to the first initial route set based on a genetic algorithm, including: calculating a first initial score of a first initial route in the first initial route set; selecting the first initial route from the first initial route set as a first parental individual according to the first initial score; selecting a second parental individual from the first initial route set; cutting out a section from the first parental individual, wherein the section includes at least two adjacent route points; deleting a route point associated with the section from the second parental individual, and implanting the section into the second parental individual to generate a child individual; and generating the route set according to the child individual.

In an embodiment of the disclosure, the step of generating the route set according to the child individual includes: exchanging at least two route points in the child individual with each other to generate a mutant child individual; and generating the route set according to the mutant child individual.

In an embodiment of the disclosure, the step of generating the route set according to the first initial route set based on the genetic algorithm further includes: generating a second initial route set according to the route points; generating a first route set corresponding to the first initial route set and a second route set corresponding to the second initial route set based on the genetic algorithm; and adding at least one route in the second route set to the first route set to continue to execute the genetic algorithm to generate the route set.

In an embodiment of the disclosure, the step of adding the at least one route in the second route set to the first route set to continue to execute the genetic algorithm to generate the route set includes: determining a number of the at least one route according to a ratio.

In an embodiment of the disclosure, the method further includes: filtering a route in the first route set according to a sequence of a third route point in the route in the first route set.

In an embodiment of the disclosure, the first route set includes at least one of the first parental individual, the second parental individual, the child individual, and the mutant child individual.

In an embodiment of the disclosure, the method further includes: obtaining a map deployed with the recommended route, wherein the recommended route includes a first recommended route point and a second recommended route point adjacent to the first recommended route point; obtaining at least one obstacle point from the map; calculating a gradient value of a location on the map according to the recommended route and the at least one obstacle point based on an artificial potential field; executing gradient descent to generate a connecting line corresponding to the first recommended route point and the second recommended route point according to the gradient value, and generating a navigation route corresponding to the recommended route according to the connecting line, including: in response to the connecting line not connecting the first recommended route point to the second recommended route point, adjusting a hyperparameter of the artificial potential field to update the connecting line.

In an embodiment of the disclosure, the hyperparameter includes at least one of an attraction field corresponding to a route point, a repulsion field corresponding to an obstacle point, a radius of the attraction field, a radius of the repulsion field, and a decay ratio of attraction or repulsion.

An electronic device for route planning of the disclosure includes a processor and a transceiver. The processor is coupled to the transceiver, wherein the processor is configured to perform: obtaining multiple route points through the transceiver, and generating a route set according to the route points, wherein a first route in the route set includes a first order corresponding to the route points, wherein the first order includes a first route point and a second route point adjacent to the first route point; obtaining multiple weights respectively corresponding to the route points through the transceiver; calculating a first score of the first route according to a distance or time between the first route point and the second route point and the weights, and selecting the first route from the route set as a recommended route according to the first score; and outputting the recommended route through the transceiver.

In an embodiment of the disclosure, the processor further executes: generating the recommended route according to a genetic algorithm, wherein a function value of an optimization equation of the genetic algorithm includes the first score.

In an embodiment of the disclosure, the processor further executes: generating a first initial route set according to the route points; and generating the route set according to the first initial route set based on a genetic algorithm, including: calculating a first initial score of a first initial route in the first initial route set; selecting the first initial route from the first initial route set as a first parental individual according to the first initial score; selecting a second parental individual from the first initial route set; cutting out the section from the first parental individual, wherein the section includes at least two adjacent route points; deleting a route point associated with the section from the second parental individual, and implanting the section into the second parental individual to generate a child individual; and generating the route set according to the child individual.

In an embodiment of the disclosure, the processor further executes: exchanging at least two route points in the child individual with each other to generate a mutant child individual; and generating the route set according to the mutant child individual.

In an embodiment of the disclosure, the processor further executes: generating a second initial route set according to the route points; generating a first route set corresponding to the first initial route set and a second route set corresponding to the second initial route set based on the genetic algorithm; and adding at least one route in the second route set to the first route set to continue to execute the genetic algorithm to generate the route set.

In an embodiment of the disclosure, the processor further executes: determining a number of the at least one route according to a ratio.

In an embodiment of the disclosure, the processor further executes: filtering a route in the first route set according to a sequence of a third route point in the route in the first route set.

In an embodiment of the disclosure, the first route set includes at least one of the first parental individual, the second parental individual, the child individual, and the mutant child individual.

In an embodiment of the disclosure, the processor further executes: obtaining a map deployed with the recommended route, wherein the recommended route includes a first recommended route point and a second recommended route point adjacent to the first recommended route point; obtaining at least one obstacle point from the map; calculating a gradient value of a location on the map according to the recommended route and the at least one obstacle point based on an artificial potential field; executing gradient descent to generate a connecting line corresponding to the first recommended route point and the second recommended route point according to the gradient value, and generating a navigation route corresponding to the recommended route according to the connecting line, including: in response to the connecting line not connecting the first recommended route point to second recommended route point, adjusting a hyperparameter of the artificial potential field to update the connecting line.

In an embodiment of the disclosure, the hyperparameter includes at least one of an attraction field corresponding to a route point, a repulsion field corresponding to an obstacle point, a radius of the attraction field, a radius of the repulsion field, and a decay ratio of attraction or repulsion.

Based on the above, the electronic device of the disclosure may generate the optimal recommended route according to the genetic algorithm by considering factors such as the route length and the weight of the route point.

BRIEF DESCRIPTION OF THE DRAWINGS

FIG. 6 is a flowchart of a method of route planning according to an embodiment of the disclosure.

DETAILED DESCRIPTION OF DISCLOSED EMBODIMENTS

Figure 1:
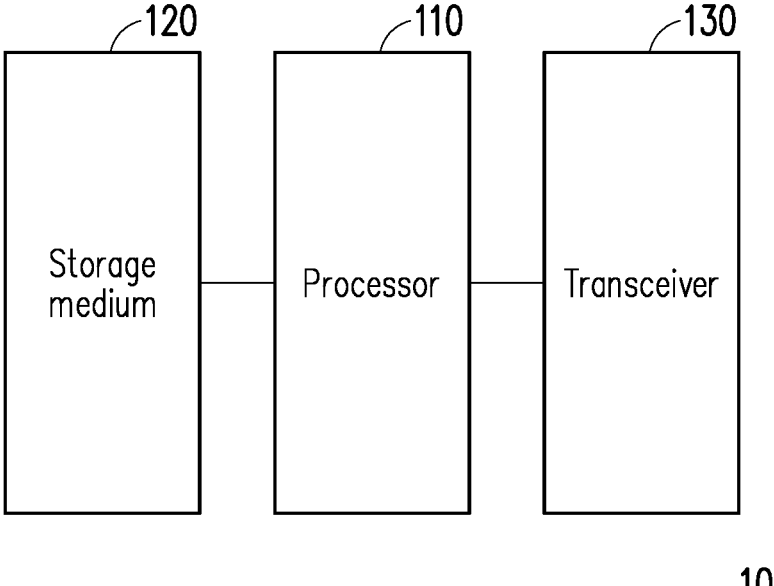
FIG. 1 is a schematic diagram of an electronic device for route planning according to an embodiment of the disclosure.

In order for the content of the disclosure to be more comprehensible, the following specific embodiments are given as examples according to which the disclosure can indeed be implemented. In addition, wherever possible, elements/components/steps using the same reference numerals in the drawings and the embodiments represent the same or similar parts.

FIG. 1 is a schematic diagram of an electronic device 100 for route planning according to an embodiment of the disclosure. The electronic device 100 includes a processor 110, a storage medium 120, and a transceiver 130.

The processor 110 is, for example, a central processing unit (CPU), other programmable general purpose or specific purpose micro control units (MCU), microprocessors, digital signal processors (DSP), programmable controllers, application specific integrated circuits (ASIC), graphics processing units (GPU), image signal processors (ISP), image processing units (IPU), arithmetic logic units (ALU), complex programmable logic devices (CPLD), field programmable gate arrays (FPGA), other similar elements, or a combination of the above elements. The processor 110 may be coupled to the storage medium 120 and the transceiver 130, and accesses and executes multiple modules and various applications stored in the storage medium 120.

The storage medium 120 is, for example, any type of fixed or removable random-access memory (RAM), read-only memory (ROM), flash memory, hard disk drive (HDD), solid state drive (SSD), similar elements, or a combination of the above elements for storing multiple modules or various applications executable by the processor 110.

The transceiver 130 transmits and receives signals in a wireless or wired manner. The transceiver 130 may also execute, for example, low noise amplification, impedance matching, frequency mixing, up or down frequency conversion, filtering, amplification, and similar operations.

Figure 2A:
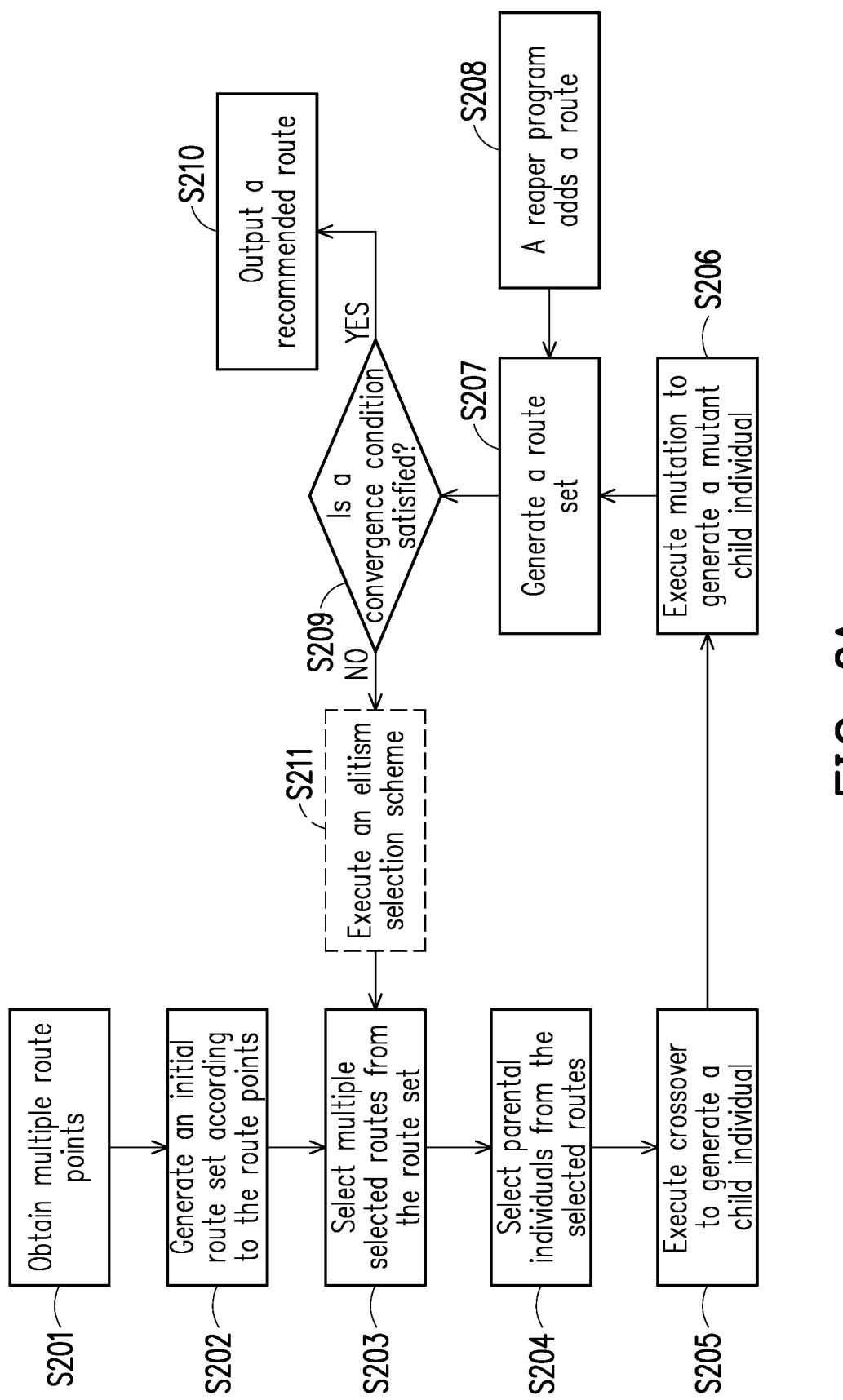
FIG. 2A is a flowchart of route planning according to an embodiment of the disclosure.
Figure 3:
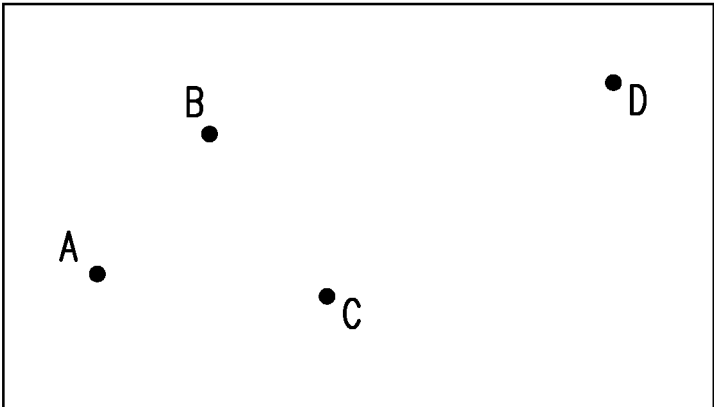
FIG. 3 is a schematic diagram of multiple route points on a map according to an embodiment of the disclosure.

FIG. 2A is a flowchart of route planning according to an embodiment of the disclosure, wherein the process of FIG. 2A may be implemented by the electronic device 100 shown in FIG. 1. In Step S201, the processor 110 may obtain multiple route points on a map through the transceiver 130. For example, multiple locations that need delivery are obtained as multiple route points. Relevant information such as coordinates and floor numbers of the locations may be pre-stored in the storage medium 120 or relevant information such as coordinates or floor numbers of the route points are received by the transceiver 130. Taking FIG. 3 as an example, the processor 110 obtains a route point A, a route point B, a route point C, and a route point D on the map.

The processor 110 may further obtain the weight of each route point. Table 1 is an example of the weights of the route point A, the route point B, the route point C, and the route point D. The higher the weight, the higher the importance of the route point. For example, assuming that the route points A, B, C, and D represent residences of customers who ordered meal deliveries, the processor 110 may determine the weights of the route points according to the amount of tips given by the customers. Since the customer of the route point A tipped the most, the processor 110 sets the highest weight for the route point A. Path points with higher weights have better chances to obtain meals earlier.

TABLE 1

| Route point | A | B | C | D |
|---|---|---|---|---|
| Weight | 10 | 4 | 8 | 0 |

Figure 4A:
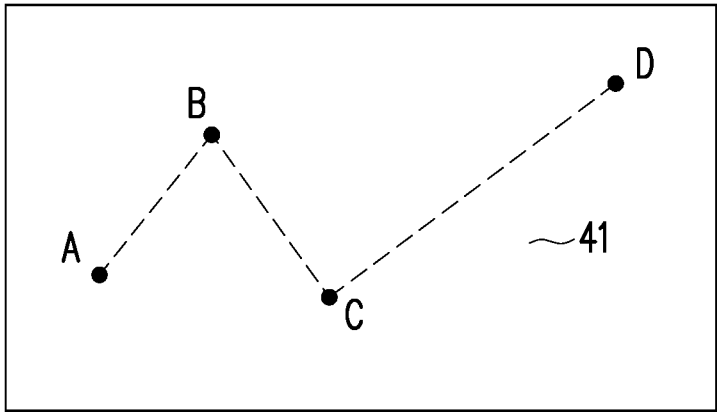
FIG. 4A and FIG. 4B are respectively schematic diagrams of initial routes according to an embodiment of the disclosure.
Figure 4B:
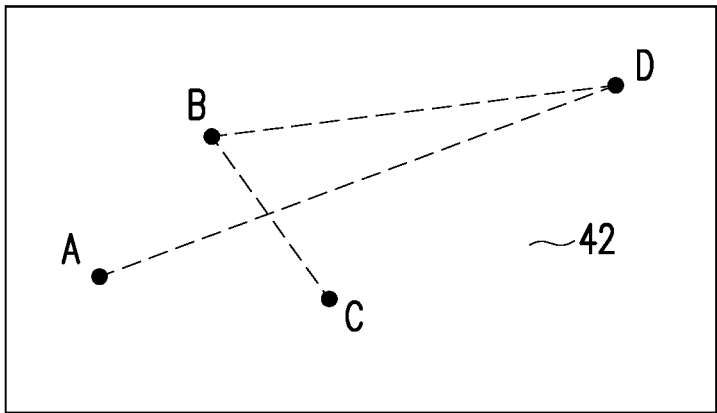

Returning to FIG. 2A, in Step S202, the processor 110 generates an initial route set according to the route points. The initial route set includes multiple initial routes, wherein each initial route includes multiple route points and an order corresponding to the route points. For example, Table 2 is an example of the initial routes generated by the processor 110 according to the route point A, the route point B, the route point C, and the route point D. The initial routes of Table 2 may form an example of the initial route set. Taking an initial route [A, B, C, D] as an example, the initial route [A, B, C, D] represents setting off from the route point A, sequentially passing by the route point B and the route point C, and finally reaching the route point D. FIG. 4A and FIG. 4B are respectively schematic diagrams of the initial route [A, B, C, D] and an initial route [A, D, B, C] according to an embodiment of the disclosure, wherein a route 41 represents the initial route [A, B, C, D] and a route 42 represents the initial route [A, D, B, C].

TABLE 2

| Initial route |
|---|
| [A, B, C, D] |

TABLE 2-continued

| Initial route |
|---|
| [A, D, B, C] |
| [B, A, D, C] |
| [A, B, D, C] |

Returning to FIG. 2A, in Step S203, the processor 110 selects multiple selected routes from the route set (or the initial route set). Specifically, when the processor 110 executes Step S203 for the first time, the processor 110 selects the selected routes from the initial route set generated in Step S202. When the processor 110 is not executing Step S203 for the first time, the processor 110 selects the selected routes from the route set generated in Step S207. Table 3 is an example of the selected routes selected by the processor 110 according to the initial route set of Table 2. The processor 110 selects three routes such as the route [A, B, C, D], the route [A, D, B, C], and a route [B, A, D, C] from the initial route set of Table 2 as the selected routes of Table 3.

TABLE 3

| Selected route |
|---|
| [A, B, C, D] |
| [A, D, B, C] |
| [B, A, D, C] |

In an embodiment, the processor 110 selects the selected routes from the initial route set according to at least one of a random selection scheme, a disruptive selection scheme, a proportionate selection scheme, or an elitism selection scheme.

In an embodiment, the processor 110 respectively calculates a score for each initial route in the initial route set, and selects a route with a lower score from the initial route set as a selected route according to the score. Such method can take into account weight and distance or take into account weight and time to select a route with a shorter distance or less time. Equation (1) is the calculation manner of a score S of a route, where N is the number of route points included in the route, F(i) is a score function of an i-th route point, $|\overrightarrow{v_{i,j}}|$ is a distance of a section ij between the i-th route point and a j-th route point, $\alpha$ is a constant, $w_i$ is the weight of the i-th route point, and $w_j$ is the weight of the j-th route point. The weight (for example, $w_i$ or $w_j$) may be customized by the user according to the importance of the route point. If the importance is higher, the weight value is set to be higher. If the importance is lower, the weight value is set to be lower. In an embodiment, $q_j=j$ (where $q_j$ represents a j-th location of the entire route, that is, the value of $q_j$ is the same as the location of the j-th route point in the route), that is, $q_j$ may be positively correlated with the sequence of an end point (that is, the j-th route point) of the section ij in the route.

$$S = \sum_{i=1}^{N-1} F(i) = \left| \sum_{i=1}^{N-1} \frac{|\overrightarrow{v_{i,j}}|}{\alpha \cdot q_j \cdot [1 + \text{sigmoid}(w_i + w_j)]} \right| \quad (1)$$

In an embodiment, the processor 110 may respectively calculate a score for each initial route in the initial route set, and select a route with a lower score from the initial routes as a selected route according to the score. Equation (2) is the calculation manner of a score S2 of a route, where G(i) is a score function of the i-th route point, $|\overrightarrow{t_{i,j}}|$ is the time required for proceeding from the i-th route point to the j-th route point, and $w_{i,j}$ is the weight of the i-th route point and the j-th route point. The weight $w_{i,j}$ may be customized by the user. The weight $w_{i,j}$ may highlight the importance of proceeding from the i-th route point to the j-th route point. If the importance is higher, it means that the section from the i-th route point to the j-th route point has a higher probability of shortening the time required for the entire route, and the value of the weight $w_{i,j}$ may be set to be higher. If the importance is lower, it means that the section from the i-th route point to the j-th route point has a lower probability of shortening the time required for the entire route, and the value of the weight $w_{i,j}$ may be set to be lower. Table 4 is an example of the weight $w_{i,j}$ and the time $t_{i,j}$ between the route points A, B, C, and D. Table 4 may be pre-stored in the storage medium 120 or received by the transceiver 130. In an embodiment, the processor 110 may look up the table according to the initial route, obtain the time required for proceeding from the i-th route point to the j-th route point and the weight to be substituted into Equation (2) to calculate the score of each initial route, and select the route with the lower score from the scores as the selected route. The weights of the route point A and the route point D are higher, which represents the degree of attention of the customers. In Table 4, the time and the weight from the route point A to the route point D are different from the time and the weight from the route point D to the route point A because the route passed from the route point A to the route point D and the route passed from the route point D to the route point A are not the same.

$$S2 = \sum_{i=1}^{N-1} G(i) = \left| \sum_{i=1}^{N-1} \frac{\overrightarrow{t_{i,j}}}{w_{i,j}} \right| \qquad (2)$$

TABLE 4

|  | Route point A | Route point B | Route point C | Route point D |
|---|---|---|---|---|
| Time |  |  |  |  |
| Route point A | 0 | 50 | 30 | 20 |
| Route point B | 50 | 0 | 32 | 59 |
| Route point C | 30 | 32 | 0 | 10 |
| Route point D | 18 | 59 | 10 | 0 |
| Weight |  |  |  |  |
| Route point A | 0 | 1 | 1 | 5 |
| Route point B | 1 | 0 | 1 | 1 |
| Route point C | 1 | 1 | 0 | 1 |
| Route point D | 10 | 1 | 1 | 0 |

After obtaining the selected routes, the processor 110 generates the route set according to a genetic algorithm, wherein an optimization equation of the genetic algorithm may be Equation (1) or Equation (2). In other words, the score S may be the function value of the optimization equation. Specifically, in Step S204, the processor 110 selects at least two selected routes from the selected routes as parental individuals of the genetic algorithm. In an embodiment, the processor 110 may select the parental individuals from the selected routes on a random basis. Table 5 is an example of the parental individuals selected by the processor 110 according to the selected routes of Table 3. The processor 110 selects two routes such as the route [A, B, C, D] and the route [A, D, B, C] from the selected routes of Table 3 as the parental individuals of Table 5.

TABLE 5

| Parental individual |
|---|
| [A, B, C, D] |
| [A, D, B, C] |

In Step S205, the processor 110 executes crossover for the parental individuals to generate a child individual.

In an embodiment, the processor 110 executes crossover for the parental individuals to generate the child individual according to at least one of partially matched crossover (PMX), order crossover (OX), position-based crossover (PBX), order-based crossover, or cycle crossover.

In an embodiment, the processor 110 randomly cuts out a section from a father individual, wherein the section includes at least two adjacent route points. Next, the processor 110 deletes the route points associated with the section from a mother individual, and implants the section cut out from the father individual at a random position in the mother individual, so as to generate the child individual. Taking Table 5 as an example, it is assumed that an individual [A, B, C, D] is the father individual, and an individual [A, D, B, C] is the mother individual. The processor 110 may generate a random position and a random length, and cut out a section including at least two route points from the father individual according to the random position and the random length. If the random position is "2" and the random length is "2", the processor 110 may select the route point B representing the 2-nd route point from the father individual according to the random position. Next, the processor 110 may determine to cut out a section with a length of 2 and a starting point of the route point B, that is, a section BC including the route point B and the route point C, from the father individual according to the random length. Next, the processor 110 deletes the route point B and the route point C from the mother individual to generate a variable sequence [A, D]. The processor 110 implants the section BC into a random position (for example, before the route point A) in the variable sequence [A, D], so as to generate a child individual [B, C, A, D]. If the random position is "3" and the random length is "2", the processor 110 may select the route point C representing the 3-rd route point from the father individual according to the random position. Next, the processor 110 may determine to cut out a section with a length of 2 and a starting point of the route point C, that is, a section CD including the route point C, and the route point D, from the father individual according to the random length. Next, the processor 110 deletes the route point C and the route point D from the mother individual to generate a variable sequence [A, B]. The processor 110 implants the section CD into a random position (for example, before the route point A) in the variable sequence [A, B], so as to generate a child individual [C, D, A, B]. In an embodiment, the processor 110 may continuously generate the child individuals according to the above manner until the number of child individuals reaches a preset value.

In Step S206, the processor 110 executes mutation for the child individual to generate a mutant child individual.

In an embodiment, the processor 110 executes mutation for the child individual to generate the mutant child individual according to at least one of displacement mutation (DM), inversion mutation operator (SIM), or scramble mutation (SM).

In an embodiment, the processor 110 randomly exchanges at least two route points in the child individual with each other to generate the mutant child individual. Taking the child individual [B, C, A, D] as an example, the processor 110 exchanges the route point C and the route point A in the child individual with each other to generate a mutant child individual [B, A, C, D]. Taking the child individual [C, D, A, B] as an example, the processor 110 exchanges the route point C and the route point A in the child individual with each other to generate a mutant child individual [A, D, C, B].

In Step S207, the processor 110 generates a route set according to each individual generated in the previous step. The route set includes the parental individuals (for example, the father individual and the mother individual), the child individual, and/or the mutant child individual. Table 6 is an example of the route set, wherein the route set includes the father individual [A, B, C, D], the mother individuals [A, D, B, C], the child individual [B, C, A, D], the child individual [C, D, A, B], the mutant child individual [B, A, C, D], and the mutant child individual [A, D, C, B]. The ratio of the number of child individuals to mutant child individuals may be customized by the user. In the example of Table 6, the ratio of the number of child individuals to mutant child individuals is 1, so the number of child individuals is equal to the number of mutant individuals.

TABLE 6

| Route |
| --- |
| [A, B, C, D] |
| [A, D, B, C] |
| [B, C, A, D] |
| [C, D, A, B] |
| [B, A, C, D] |
| [A, D, C, B] |

Figure 2B:
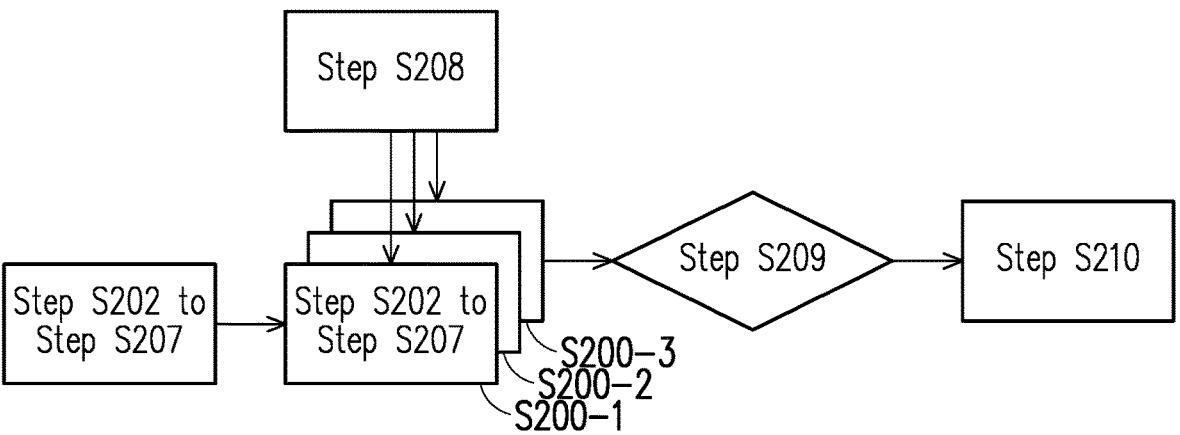
FIG. 2B is a flowchart of generating a route set based on a parallel universe architecture according to an embodiment of the disclosure.

The processor 110 may generate multiple parallel universes according to the genetic algorithm to generate or update the route set, that is, take the initial route set as a first initial route set. The processor 110 establishes or sets a first virtual world. In the first virtual world, the processor 110 executes Step S202 to Step S207 based on the first initial route set to generate the corresponding child individual. Next, the processor 110 establishes or sets a second virtual world. In the second virtual world, the processor 110 additionally generates a different initial route set as a second initial route set, and executes Step S202 to Step S207 based on the second initial route set to generate the corresponding child individual. The first virtual world and the second virtual world may respectively operate in parallel, so the processor 110 may treat multiple virtual worlds operating in parallel as multiple parallel universes. In an embodiment, the number of virtual worlds may be adjusted according to the requirements of the user. It is assumed that the route set is a first route set. In an embodiment, the processor 110 may independently execute the process of Step S202 to Step S207 another time using a different initial route set to generate another route set. Taking FIG. 2B as an example, the processor 110 executes the genetic algorithm respectively using different initial route sets, including Process S200-1, Process S200-2, and Process S200-3 of Step S202 to Step S207, so as to respectively generate the first route set corresponding to Process S200-1, a second route set corresponding to Process S200-2, and a third route set corresponding to Process S200-3. Assuming that the parental individuals, the child individual, and/or the mutant child individual in the first route set form an ecosystem of a specific universe (that is, the first virtual world), the parental individuals, the child individual, and/or the mutant child individual in the second route set may form an ecosystem of another parallel universe (that is, the second virtual world), and the parental individuals, the child individual, and/or the mutant child individual in the third route set may form an ecosystem of yet another parallel universe (that is, a third virtual world). The ecosystems in different parallel universes (that is, the virtual worlds) may be independent of each other. The number of virtual worlds may be adjusted according to the requirements of the user. The processor 110 adds at least one route from the second route set and/or the third route set to the first route set to generate (or update) the route set. For example, the processor 110 may calculate a score for each route in the second route set and/or the third route set according to Equation (1) or Equation (2). Next, the processor 110 may select the route with the lower score from the second route set and/or the third route set, and add the route to the first route set to generate the route set. In an embodiment, the storage medium 120 stores a reaper program, and the processor 110 may execute the reaper program. The reaper program is used to select the route with the lower score from the route set in each virtual world. For example, each virtual world executes Step S202 to Step S207 in parallel, and a generation is regarded as being generated when each virtual world executes to Step S207. The processor 110 may execute the reaper program when each generation executes to Step S207, so that the reaper program adds the route to the route set in Step S208, as shown in FIG. 2A or FIG. 2B. In Step S208, the reaper program may copy the route set generated by each virtual world executing Step S207, and select the route with the lower score from the route set. The processor 110 randomly and equally distributes each of the selected routes as an individual to all the virtual worlds. Then, after the processor 110 adds the selected route to the route set generated by each virtual world, each virtual world continues to evolve (that is, continues to execute Step S209). Table 7 is an example of the second route set. Assuming that the route [A, C, B, D] in Table 7 has the lowest score (that is, the function value of the optimization equation), the processor 110 may add the route [A, C, B, D] in Table 7 to the first route set shown in Table 6, thereby generating the route set shown in Table 8. The disclosure can increase the diversity of individuals of the genetic algorithm by creating the parallel universe, thereby improving the performance of the recommended route finally output by the process in FIG. 2A and preventing the evolutionary bottleneck of the genetic algorithm, so as to obtain an optimal solution.

In an embodiment, the reaper program determines the ratio at which each virtual world communicates with each other according to a sower ratio. The sower ratio indicates the ratio of the routes in the route set (for example, the second route set) generated by other virtual worlds that are selected to be added to the first route set to all the routes in the route set. In other words, the number of routes from other virtual worlds in the first route set may be proportional to the sower ratio. If the sower ratio is equal to zero, it means that the evolution in the virtual world is not disturbed by other virtual worlds. For example, it is assumed that Process S200-1 of FIG. 2B corresponds to the first virtual world. If the sower ratio is equal to zero, the reaper program does not add the routes generated by the second virtual world and the third virtual world respectively corresponding to Process S200-2 and Process S200-3 to the route set corresponding to the first virtual world in Step S208. Therefore, when the processor 110 executes iteration of Process S200-1 to generate the route sets of different generations, the route set of each generation is only relevant to Process S200-1, but not relevant to Process S200-2 or Process S200-3.

On the other hand, if the sower ratio is equal to one, it means that the evolution in the virtual world is affected by all routes generated by other virtual worlds. For example, it is assumed that Process S200-1 of FIG. 2B corresponds to the first virtual world. If the sower ratio is equal to one, the reaper program adds all the routes in the second route set generated by the second virtual world corresponding to Process S200-2 to the route set corresponding to the first virtual world, and adds all the routes in the third route set generated by the third virtual world corresponding to Process S200-3 to the route set corresponding to the first virtual world in Step S208. In other words, when Process S200-1 generates a route set of the next generation, the route set of the next generation is associated with the routes generated by Process S200-2 or Process S200-3.

TABLE 7

| Route |
| --- |
| [A, C, B, D] |
| [D, C, B, A] |
| [D, B, A, C] |
| [C, B, A, D] |

TABLE 8

| Route |
| --- |
| [A, B, C, D] |
| [A, D, B, C] |
| [B, C, A, D] |
| [C, D, A, B] |
| [B, A, C, D] |
| [A, D, C, B] |
| [A, C, B, D] |

Returning to FIG. 2A, in Step S209, the processor 110 judges whether a convergence condition of the genetic algorithm is satisfied. If the convergence condition is satisfied, Step S210 is proceeded, and the recommended route is output. The processor 110 outputs the route with the lowest function value of the optimization equation (or the lowest score) in the route set through the transceiver 130 as the recommended route. If the convergence condition is not satisfied, Step S203 is re-executed to generate a route set of another generation. For example, assuming that the route set generated by executing Step S203 to Step S207 for the first time is for the first generation, the route set generated by executing Step S203 to Step S207 for the second time may be for the second generation, the route set generated by executing Step S203 to Step S207 for the third time may be for the third generation, and so on. In an embodiment, the processor 110 may select the recommended route from multiple route sets generated by different virtual worlds. Taking FIG. 2B as an example, assuming that the sower ratio is equal to zero, Process S200-1, Process S200-2, and Process S200-3 may respectively generate the first route set, the second route set, and the third route set that are independent of each other. The processor 110 may select the route with the lowest function value of the optimization equation (or the lowest score) from the first route set, the second route set, and the third route set as the recommended route.

Before proceeding from Step S209 to Step S203, the processor 110 may optionally execute the elitism selection scheme on the route set. In Step S211, the processor 110 may execute the elitism selection scheme. For example, the processor 110 may limit the sequence of a specific route point in the route to at least one of the first N route points or the last N route points (for example, the N-th route point or the N-th last route point) (where N is a positive integer) in the route. The processor 110 may filter the route from the route set according to the sequence of the specific route point in the route. If the sequence of the specific route point in the route matches a predefined sequence, the processor 110 may retain the route in the route set. If the sequence of the specific route point in the route does not match the predefined sequence, the processor 110 may remove the route from the route set. Taking the route set of Table 8 as an example, it is assumed that the route point A represents the user who ordered a soup noodle delivery. In order to prevent the soup noodle from being too mushy due to the delivery time being too long, the processor 110 may execute the elitism selection scheme to limit the sequence of the route point A in the route to the first 2 route points in the route. Accordingly, the route [B, C, A, D] or [C, D, A, B] in Table 8 is eliminated by the elitism selection scheme. In an embodiment, the processor 110 may prohibit the route from including a specific section composed of a specific route point. Taking the route set of Table 8 as an example, it is assumed that the route point B represents a vendor that provides soup noodles, and the route point C represents a vendor that provides boxed meals. If the route of a vehicle includes the section BC proceeding from the route point B to the route point C, it means that the soup noodle will be first placed under a storage box of the vehicle, and the boxed meal will be placed on the soup noodle. In this way, the food in the storage box may be easily knocked over. In response to this, the processor 110 may prohibit the section BC from being included in the route. Accordingly, the route [A, D, B, C] in Table 8 is eliminated by the elitism selection scheme.

In an embodiment, the convergence condition is associated with the number of iterations from Step S203 to Step S207. In other words, the convergence condition is associated with the generation of the route set generated in Step S207. If the number of iterations is greater than a threshold (that is, the generation of the route set is greater than the threshold), the processor 110 judges that the convergence condition is satisfied. If the number of iterations is less than or equal to the threshold, the processor 110 judges that the convergence condition is not satisfied.

In an embodiment, the convergence condition is associated with the function value of the optimization equation corresponding to the route set generated in Step S207. If there is a route with the function value of the optimization equation being less than the threshold in the route set, the processor 110 judges that the convergence condition is satisfied. If there is no route with the function value of the optimization equation being less than the threshold in the route set, the processor 110 judges that the convergence condition is not satisfied.

Figure 5A:
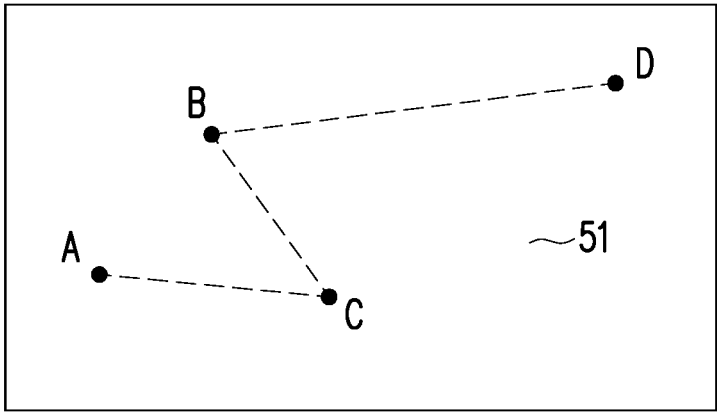
FIG. 5A is a schematic diagram of an initial navigation route according to an embodiment of the disclosure.

After generating the recommended route, the processor 110 generates a route map for navigation according to the recommended route based on an artificial potential field. First, the processor 110 obtains a map deployed with the recommended route according to the recommended route of Step S210. On the map, adjacent route points (also referred to as "recommended route points") in the recommended route are connected by a straight line to form an initial navigation route. FIG. 5A is a schematic diagram of an initial navigation route 51 according to an embodiment of the disclosure. It is assumed that the recommended route is the route [A, C, B, D], wherein the route point A is adjacent to the route point C, the route point C is adjacent to the route point B, and the route point B is adjacent to the route point D. The processor 110 connects the adjacent route points using a straight line to form the initial navigation route 51.

Figure 5B:
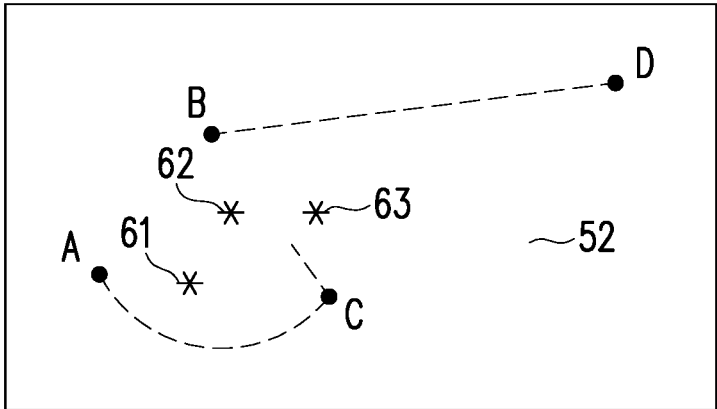
FIG. 5B is a schematic diagram of a navigation route generated based on an artificial potential field according to an embodiment of the disclosure.

Next, the processor 110 obtains coordinates of obstacle points from the map. FIG. 5B is a schematic diagram of a navigation route 52 generated based on an artificial potential field according to an embodiment of the disclosure. As shown in FIG. 5B, the processor 110 obtains an obstacle point 61, an obstacle point 62, and an obstacle point 63 from the map.

After obtaining the obstacle point, the processor 110 calculates a gradient value of each location on the map according to the recommended route and the obstacle point based on the artificial potential field. Hyperparameters of the artificial potential field include parameters such as an attraction field corresponding to the route point, the radius of the attraction field, a repulsion field corresponding to the obstacle point, the radius of the repulsion field, or a decay ratio of attraction/repulsion.

After the processor 110 calculates the gradient value of each location using the hyperparameters, the processor 110 executes gradient descent to generate (or update) a connecting line between the route points according to the gradient value, thereby generating the navigation route 52 corresponding to the recommended route. The connecting line is attracted by the attraction field of the route point and is repelled by the repulsion field of the obstacle point. Taking the connecting line between the route point A and the route point C as an example, the connecting line between the route point A and the route point C becomes a curve to bypass the obstacle point 61 due to being repelled by the repulsion field of the obstacle point 61.

When executing gradient descent to generate the connecting line between the route points, if the connecting line is stuck in a local solution, the connecting line may fail to connect adjacent route points. Taking the connecting line between the route point C and the route point B as an example, the connecting line between the route point C and the route point B is stuck in a local solution due to the repulsion fields of the obstacle point 62 and the obstacle point 63, so the connecting line cannot connect the route point C and the route point B.

Accordingly, the processor 110 adjusts (for example, decreases or increases) the hyperparameters of the artificial potential field in response to the connecting line not connecting two adjacent route points. After updating the hyperparameters, the processor 110 re-executes gradient descent to generate a connecting line that can connect the two adjacent route points. The processor 110 may execute at least one of the following steps to adjust the hyperparameters of the artificial potential field: decrease or increase the strength of the attraction field corresponding to the route point, decrease or increase the radius of the attraction field, decrease or increase the strength of the repulsion field corresponding to the obstacle point, decrease or increase the radius of the repulsion field, decrease or increase the decay ratio of attraction, or decrease or increase the decay ratio of repulsion. In the embodiment, for example, the repulsion of the obstacle point 62 and the obstacle point 63 is decreased, and the attraction between the route point C and the route point B is increased.

FIG. 6 is a flowchart of a method of route planning according to an embodiment of the disclosure, wherein the method may be implemented by the electronic device 100 shown in FIG. 1. In Step S601, multiple route points are obtained, and a route set is generated according to the route points, wherein a first route in the route set includes a first order corresponding to the route points, wherein the first order includes a first route point and a second route point adjacent to the first route point. In Step S602, multiple weights respectively corresponding to the route points are obtained. In Step S603, a first score of the first route is calculated according to a distance or time between the first route point and the second route point and the weights, and the first route is selected from the route set as a recommended route according to the first score. In Step S604, the recommended route is output.

In summary, the electronic device of the disclosure may generate the recommended route according to the genetic algorithm by considering factors such as the route length and the weight of the route point. For the parental individual as the initial route, the electronic device may cut out the section of the route from the parental individual or implant the section into the parental individual to execute the crossover process of the genetic algorithm. The electronic device may also exchange the route points in the individual with each other to execute the mutation process of the genetic algorithm. After determining the optimal order of the route points, the electronic device may adaptively adjust the hyperparameters of the artificial potential field to generate the recommended route corresponding to the optimal order according to the artificial potential field.

What is claimed is:

1. A method of route planning, comprising:
   obtaining, by a processor, a plurality of route points, and generating a route set according to the route points, wherein a first route in the route set comprises a first order corresponding to the route points, wherein the first order comprises a first route point and a second route point adjacent to the first route point;
   obtaining, by the processor, a plurality of weights respectively corresponding to the route points;
   generating, by the processor, a first initial route set according to the route points;
   generating, by the processor, the route set according to the first initial route set based on a genetic algorithm, comprising:
   calculating, by the processor, a first initial score of a first initial route in the first initial route set;
   selecting, by the processor, the first initial route from the first initial route set as a first parental individual according to the first initial score;
   selecting, by the processor, a second parental individual from the first initial route set;
   generating, by the processor, a random length;
   cutting out, by the processor, a section from the first parental individual further comprises:
   cutting out, by the processor, the section from the first parental individual according to a first random position and the random length,
   wherein the first random position reflects a route point position being cut from the first parental individual,
   wherein the random length reflects a route length being cut from the first parental individual,
   wherein the section comprises at least two adjacent route points;
   deleting, by the processor, each of route point same as each route point of the section from the second parental individual to generate a variable sequence, and implanting the section in an original sequence into the variable sequence into a second random position to generate a child individual, wherein the each of route point same as the each route point of the section in the second parental individual is deleted to get a route point deleted second parental individual, wherein the second random position reflects a second position where the section implemented into the route point deleted second parental individual, wherein the second position includes starting point of the route point deleted second parental individual and terminal point of the route point deleted second parental individual, wherein the child individual and the first parental individual are different; and generating, by the processor, the route set according to the child individual further comprises:

continuously generating, by the processor, the child individual until a number of the child individual reaches a preset value;

calculating, by the processor, a first score of the first route according to a distance or time between the first route point and the second route point and the weights, and selecting the first route from the route set as a recommended route according to the first score;

outputting, by the processor, the recommended route;

obtaining, by the processor, a map deployed with the recommended route, wherein the recommended route comprises a first recommended route point and a second recommended route point adjacent to the first recommended route point;

obtaining, by the processor, at least one obstacle point from the map;

calculating, by the processor, a gradient value of a location on the map according to the recommended route and the at least one obstacle point based on an artificial potential field;

executing, by the processor, gradient descent to generate the connecting line corresponding to the first recommended route point and the second recommended route point according to the gradient value, and generating a navigation route corresponding to the recommended route according to the connecting line, comprising:

in response to the connecting line not connecting the first recommended route point to the second recommended route point, adjusting, by the processor, a hyperparameter of the artificial potential field to update the connecting line to avoid the updated connecting line stuck in a local solution due to repulsion fields of the at least one obstacle point to connect the first recommended route point and the second recommended route point.

2. The method according to claim 1, wherein the step of selecting the first route from the route set as the recommended route according to the first score comprises:

generating the recommended route according to the genetic algorithm, wherein a function value of an optimization equation of the genetic algorithm comprises the first score.

3. The method according to claim 1, wherein the step of generating the route set according to the child individual comprises:

exchanging at least two route points in the child individual with each other to generate a mutant child individual; and generating the route set according to the mutant child individual.

4. The method according to claim 3, wherein the step of generating the route set according to the first initial route set based on the genetic algorithm further comprises:

generating a second initial route set according to the route points;

respectively generating a first route set corresponding to the first initial route set and a second route set corresponding to the second initial route set based on the genetic algorithm; and adding at least one route in the second route set to the first route set to continue to execute the genetic algorithm to generate the route set.

5. The method according to claim 4, wherein the step of adding the at least one route in the second route set to the first route set to continue to execute the genetic algorithm to generate the route set comprises:

determining a number of the at least one route in the second route set according to a ratio.

6. The method according to claim 4, further comprising:

filtering a route in the first route set according to a sequence of a third route point in the route in the first route set.

7. The method according to claim 4, wherein the first route set comprises at least one of the first parental individual, the second parental individual, the child individual, and the mutant child individual.

8. A method according to claim 1, wherein the hyperparameter comprises at least one of an attraction field corresponding to a route point, a repulsion field corresponding to an obstacle point, a radius of the attraction field, a radius of the repulsion field, and a decay ratio of attraction or repulsion.

9. An electronic device for route planning, comprising:

a transceiver; and a processor, coupled to the transceiver, wherein the processor executes:

obtaining a plurality of route points through the transceiver, and generating a route set according to the route points, wherein a first route in the route set comprises a first order corresponding to the route points, wherein the first order comprises a first route point and a second route point adjacent to the first route point;

generating a first initial route set according to the route points;

generating the route set according to the first initial route set based on a genetic algorithm, comprising:

calculating a first initial score of a first initial route in the first initial route set;

selecting the first initial route from the first initial route set as a first parental individual according to the first initial score;

selecting a second parental individual from the first initial route set;

generating, by the processor, a random length;

cutting out a section from the first parental individual further comprises:

cutting out, by the processor, the section from the first parental individual according to a first random position and the random length, wherein the first random position reflects a route point position being cut from the first parental individual, wherein the random length reflects a route length being cut from the first parental individual, wherein the section comprises at least two adjacent route points;

deleting each of route point same as each route point of the section from the second parental individual to generate a variable sequence, and implanting the section in an original sequence into the variable sequence into a second random position to generate a child individual, wherein the each of route point same as the each route point of the section in the second parental individual is deleted to get a route point deleted second parental individual, wherein the second random position reflects a second position where the section implemented into the route point deleted second parental individual, wherein the second position includes starting point of the route point deleted second parental individual and terminal point of the route point deleted second parental individual, wherein the child individual and the first parental individual are different; and generating the route set from the child individual further comprises:

continuously generating, by the processor, the child individual until a number of the child individual reaches a preset value;

obtaining a plurality of weights respectively corresponding to the route points;

calculating a first score of the first route according to a distance or time between the first route point and the second route point and the weights, and selecting the first route from the route set as a recommended route according to the first score; outputting the recommended route through the transceiver;

obtaining a map deployed with the recommended route, wherein the recommended route comprises a first recommended route point and a second recommended route point adjacent to the first recommended route point;

obtaining at least one obstacle point from the map;

calculating a gradient value of a location on the map according to the recommended route and the at least one obstacle point based on an artificial potential field;

executing gradient descent to generate the connecting line corresponding to the first recommended route point and the second recommended route point according to the gradient value, and generating a navigation route corresponding to the recommended route according to the connecting line, comprising:

in response to the connecting line not connecting the first recommended route point to the second recommended route point, adjusting, by the processor, a hyperparameter of the artificial potential field to update the connecting line to avoid the updated connecting line stuck in a local solution due to repulsion fields of the at least one obstacle point to connect the first recommended route point and the second recommended route point.

10. The electronic device according to claim 9, wherein the processor further executes:

generating the recommended route according to the genetic algorithm, wherein a function value of an optimization equation of the genetic algorithm comprises the first score.

11. The electronic device according to claim 9, wherein the processor further executes:

exchanging at least two route points in the child individual with each other to generate a mutant child individual; and generating the route set according to the mutant child individual.

12. The electronic device according to claim 11, wherein the processor further executes:

generating a second initial route set according to the route points;

respectively generating a first route set corresponding to the first initial route set and a second route set corresponding to the second initial route set based on the genetic algorithm; and adding at least one route in the second route set to the first route set to continue to execute the genetic algorithm to generate the route set.

13. The electronic device according to claim 12, wherein the processor further executes:

determining a number of the at least one route in the second route set according to a ratio.

14. The electronic device according to claim 12, wherein the processor further executes:

filtering a route in the first route set according to a sequence of a third route point in the route in the first route set.

15. The electronic device according to claim 12, wherein the first route set comprises at least one of the first parental individual, the second parental individual, the child individual, and the mutant child individual.

16. The electronic device according to claim 9, wherein the hyperparameter comprises at least one of an attraction field corresponding to a route point, a repulsion field corresponding to an obstacle point, a radius of the attraction field, a radius of the repulsion field, and a decay ratio of attraction or repulsion.

* * * * *